United States Patent
Kohlstruck et al.

[11] Patent Number: 6,011,324
[45] Date of Patent: Jan. 4, 2000

[54] ARRANGEMENT FOR ENSURING UNINTERRUPTED CURRENT SUPPLY TO AN ELECTRICAL CONSUMER

[75] Inventors: Bernd Kohlstruck, Neu Anspach; Norbert Berg, Darmstadt, both of Germany

[73] Assignee: AEG Energietechnik GmbH, Frankfurt, Germany

[21] Appl. No.: 09/051,095

[22] PCT Filed: Oct. 7, 1996

[86] PCT No.: PCT/EP96/04340

§ 371 Date: Sep. 8, 1998

§ 102(e) Date: Sep. 8, 1998

[87] PCT Pub. No.: WO97/15106

PCT Pub. Date: Apr. 24, 1997

[30] Foreign Application Priority Data

Oct. 14, 1995 [DE] Germany .................... 195 38 381

[51] Int. Cl.⁷ .................................................. H02J 7/00
[52] U.S. Cl. .................... 307/64; 307/65; 307/66; 307/80
[58] Field of Search .................... 307/64, 66, 65, 307/85, 86, 125, 130, 131; 340/333; 315/160

[56] References Cited

U.S. PATENT DOCUMENTS

| | | | |
|---|---|---|---|
| 4,084,038 | 4/1978 | Scragg et al. | 429/19 |
| 4,251,735 | 2/1981 | Coleman | 307/66 |
| 4,251,736 | 2/1981 | Coleman | 307/66 |
| 4,471,233 | 9/1984 | Roberts . | |
| 4,670,702 | 6/1987 | Yamada et al. | 307/66 |
| 4,703,193 | 10/1987 | Kawabata | 307/66 |
| 4,775,800 | 10/1988 | Wood | 307/66 |
| 5,081,367 | 1/1992 | Smith et al. . | |
| 5,105,142 | 4/1992 | Takabayashi | 320/3 |
| 5,138,185 | 8/1992 | Weinstock . | |
| 5,198,970 | 3/1993 | Kawabata et al. | 307/66 |
| 5,401,589 | 3/1995 | Palmer et al. | 429/13 |
| 5,420,497 | 5/1995 | Kimura et al. | 307/64 |
| 5,612,580 | 3/1997 | Janonis et al. | 307/64 |
| 5,747,887 | 5/1998 | Takanaga et al. | 307/64 |
| 5,783,932 | 7/1998 | Namba et al. | 307/64 |

FOREIGN PATENT DOCUMENTS

| | | |
|---|---|---|
| 0 018 521 A1 | 11/1980 | European Pat. Off. . |
| 1 690 027 | 7/1971 | Germany . |
| 2 250 437 | 4/1974 | Germany . |
| 39 12 941 A1 | 11/1989 | Germany . |
| 2 190 551 | 11/1987 | United Kingdom . |

OTHER PUBLICATIONS

NTT Review, vol. 6, No. 2, Mar. 1, 1994, pp. 47–53, XP000446893, Asano N. et al: "The Future of Our Fuel Cell Total Energy System".

Vielstich: Brennstoffelemente, Verlag Chemie GmbH Weinheim/Bergstrasse, 1965, S. 368, 369.

Primary Examiner—Jeffrey Gaffin
Assistant Examiner—Peter Zura
Attorney, Agent, or Firm—Jones, Tullar & Cooper

[57] ABSTRACT

An arrangement is disclosed for ensuring an uninterrupted current supply to at least one electrical consumer which draws energy from an alternating voltage network and is supplied with energy in the event of a network failure by a fuel cell. The fuel cell (8) is connected at its electrical outputs to at least one current inverter (7) whose output is connected to the minimum of one alternating voltage consumer (1, 2) and to a branch containing a switch (4) on the consumer side of the switch; the switch is connected to an alternating voltage network (6) and is opened in the event of the voltage in the alternating voltage network falling below a predetermined level and closed if the alternating voltage is above that threshold; and the fuel cell operates in stand-by mode if the network voltage is above the threshold, and, if voltage is below the threshold, in a mode in which the energy required by the consumer is supplied via the current inverter (7).

8 Claims, 1 Drawing Sheet

ARRANGEMENT FOR ENSURING UNINTERRUPTED CURRENT SUPPLY TO AN ELECTRICAL CONSUMER

BACKGROUND OF THE INVENTION

1. Field of the Invention

The present invention relates to an arrangement for insuring uninterrupted current supply to at least one electrical consumer, whose energy is taken from an a.c. power supply network and which is supplied with energy from a fuel cell in case of a network outage.

2. Prior Art

An arrangement of this type is known from the NTT Review, vol. 6, no. 2, Mar. 1, 1994, pages 47 to 53, XP000446893, Asano N. et al.: "The future of our fuel cell total energy system". During continuous operation, a PAFC (phosphoric acid fuel cell) is connected there parallel with an a.c. voltage network. If the a.c. voltage network fails, the fuel cell takes on the supply of energy.

A further arrangement is known from DE-PS 16 00 027. In connection with this arrangement a first rectifier is connected to an a.c. voltage network. A capacitor and a consumer are connected in parallel with the output of a comparator. The consumer is furthermore connected via a switch to a fuel cell. The output of a second rectifier, which is also supplied by the a.c. voltage network, is furthermore connected in parallel with the fuel cell. The second rectifier generates a countervoltage corresponding to the output voltage of the fuel cell in order to keep the gas consumption of the fuel cell as low as possible when the network voltage is intact.

It is known from the book "Brennstoffelemente" [Fuel Elements], Verlag Chemie GmbH, Weinheim, Bergstraβe, 1965, p. 368, to employ fuel cells as emergency power installations.

Interruption-free current supply arrangements are used to supply consumers, whose outage because of the loss of supply voltage leads to an impermissible and undesirable disruption of an operation. Some operations are already endangered by a voltage collapse of short duration. Voltage collapses in a supply network can be caused by ground faults or short circuits, line interruptions or switching processes. Interruption-free current supply arrangements are used in hospitals, for example, where an outage of the public network can endanger the life and health of people. Interruption-free current supply arrangements are also practical for preventing property damage in case of network outage. Interruption-free current supply arrangements should be differentiated from network replacement arrangements, which assure the power supply during extended network outages. Interruption-free current supply arrangements already take over the power supply in case of network outages of a few milliseconds for a tiding-over period of a few minutes up to 15 minutes or more.

Rechargeable batteries are used as energy reservoirs for interruption-free current supply installations. With some installations, these batteries are the main energy reservoirs, and with others they are short-term reservoirs in connection with Diesel units. Generally, closed lead batteries with a liquid electrolyte, closed lead batteries with a fixed electrolyte or NiCd batteries are used. Control and monitoring devices must be provided in an interruption-free current supply arrangement, by means of which interruptions which cause the outage of the battery are detected and prevent the deep charging along with overcharging of the battery.

The outage of the battery must be detected and reported in good time. The charging unit must recharge the battery within a defined period of time, because of which the interruption-free current supply arrangement cannot remove energy from the battery for this period of time.

SUMMARY OF THE INVENTION

The present invention has as an object developing an interruption-free current supply arrangement for a.c. voltage consumers which generates the a.c. voltage for the consumer without a large outlay within a short time after the network voltage has fallen below a predeterminable threshold value.

In connection with an arrangement of the type described at the outset, this object is achieved in accordance with the present invention in that the electrical outputs of the fuel cell are connected to at least one inverted rectifier, whose output is connected with the at least one consumer and with an arm containing a switch on the side of the switch facing the consumer, that the switch is connected with an a.c. voltage network when the network voltage lies above a threshold, a switch connects the a.c. voltage network with the consumer, that, when the network voltage lies below the threshold, the switch separates the a.c. voltage network from the consumer, that a polymer electrolyte diaphragm fuel cell is provided, that the fuel cell is in a standby operation when the network voltage lies above the threshold, and that the fuel cell takes over the energy supply within a few milliseconds, when the network voltage drops below the threshold.

The arrangement in accordance with the present invention operates in a network-inverted rectifier parallel mode. The inverted rectifier supplied by the fuel cell operates in the standby mode. In case of a network interruption by a voltage drop below the threshold, the switch is opened and the supply of the reactants to the fuel cell is suddenly increased. It has been shown that the fuel cell can supply the increased current flowing into the low impedance interrupted network until the opening of the switch. The switch is opened after a time period which can extend from a few milliseconds up to a tenth of a second, so that there is no danger of overloading the fuel cell. For decoupling, a choke in particular is arranged on the network connection side in series with the switch.

A rectifier, which is connected to the network, is preferably provided, which covers the open-circuit losses of the inverted rectifier and the reactive power during uninterrupted network operation. With this arrangement the output to be provided by the fuel cell in open-circuit operation of the inverted rectifier is reduced to a very low value, so that the use of reactants is correspondingly small.

In connection with a practical embodiment, hydrogen and oxygen is supplied to the fuel cell from pressurized containers, wherein the supply is throttled during standby operations and is strong during operation at normal rating by means of opened valves. Since during standby operation the reactant usage is relatively small, the gas supplies last very long if no network interruption occurs.

The oxygen in particular is contained in the air which is stored in a compressed air reservoir. It is therefore not necessary to operate the fuel cell with pure oxygen. Compressed air is available at reasonable cost. It can also be generated by a compressor.

The fuel cell preferably is embodied as a polymer electrolyte diaphragm fuel cell. A fuel cell of that type has a high power density and operates at operating temperatures between 80 and 90° C. This fuel cell can be rapidly changed from standby operation to full rated output and is stable for a short time under high current removal rates.

It is advantageous to monitor the operational readiness of the fuel cell by means of pressure sensors, which measure the pressures of the reactants and which issue a report in case of at least one threshold value assigned to a limit of the reactant supply. If the report is generated, it is possible to supplement, or respectively refill, the supply of reactants. It is also advantageous if the inverted rectifier is equipped with a current limiter.

BRIEF DESCRIPTION OF THE DRAWINGS

The present invention will be described in more detail in what follows by means of exemplary embodiments, represented in a drawing, from which ensue further details, characteristics and advantages.

The sole FIGURE is a partial block circuit diagram of the interruption-free current supply arrangement according to the present invention.

DETAILED DESCRIPTION OF THE PREFERRED EMBODIMENTS

Figure 1:
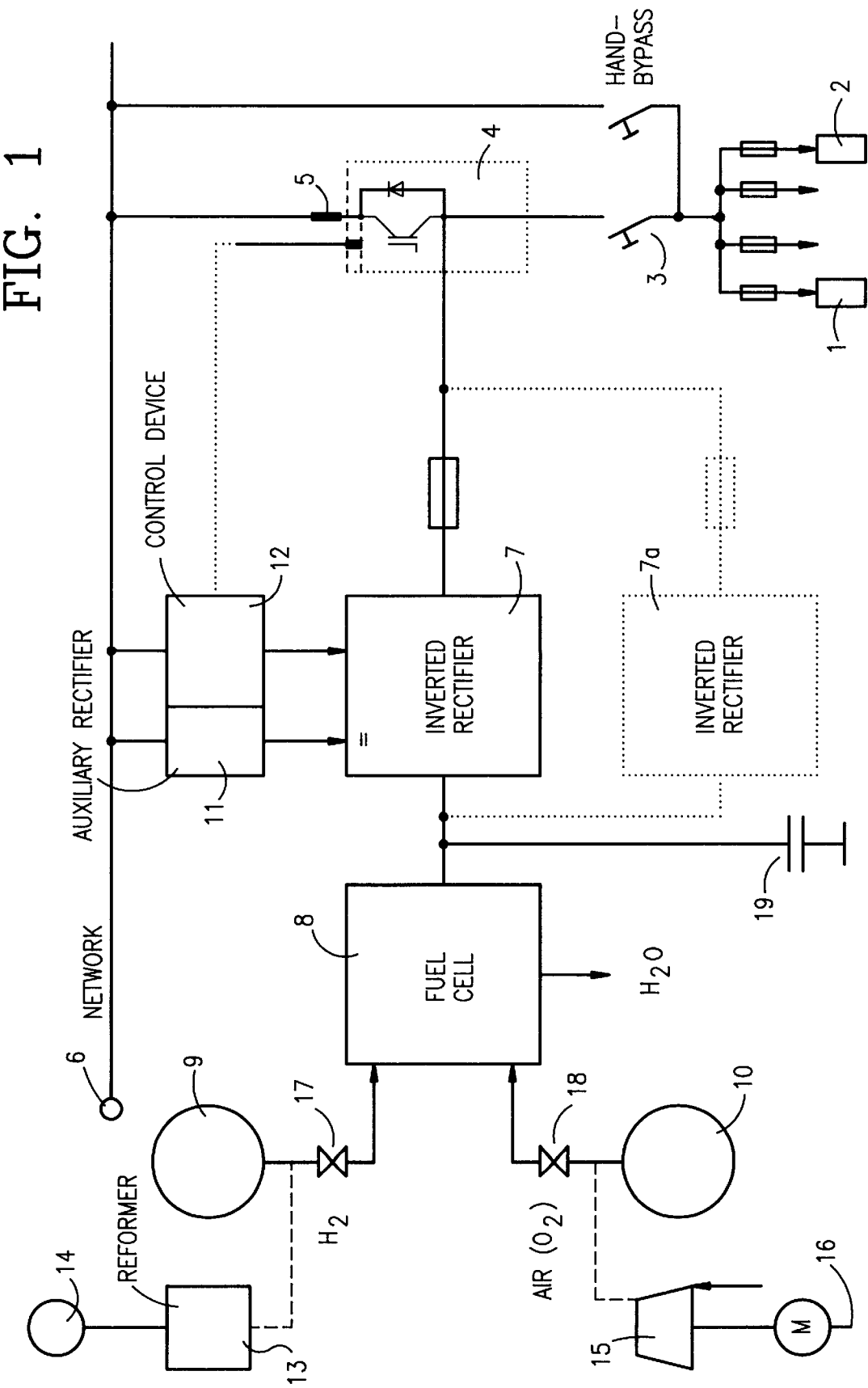

A number of consumers 1, 2, which are represented in FIG. 1 by resistance symbols, but can also be other loads, such as motors, are connected via a common switch 3 to a rapid operation contactless switch 4, upstream of which a choke 5 for uncoupling from the network is disposed. On the input side, the choke 5 is connected with a public supply network 6. The circuit elements have been represented single-phased in the drawing FIGURE. However, these can also be three-phase consumers, i.e. the supply is laid out in three-phase.

The output of an inverted rectifier 7 is connected to the output of the contactless switch 4 on the consumer side, whose input rectifier is connected with the electrodes of a fuel cell 8. Further inverted rectifiers, for example 7a, can be connected in parallel with the inverted rectifier 7. The fuel cell 8 is connected to a hydrogen tank 9 and a compressed air tank 10. A controllable valve 17 is arranged between the tank 9 and the fuel cell 10, and a controllable valve 18 between the tank 10 and the fuel cell 8.

An auxiliary rectifier 11 is also supplied by the network 6, which is laid out for a lower output than the inverted rectifier 7, which is a static, self-commutated, network-synchronous inverted rectifier 7. The auxiliary rectifier 11 covers the open-circuit losses of the inverted rectifier 7 and supplies a control device 12, which generates a control voltage for the contactless switch 4. The latter is transmittingly controlled by the control voltage of the device 12 if a sufficiently high network voltage is available. With the network uninterrupted, the current flows over the choke 5 and the switch 4 to the consumers. In case the consumers must be provided with voltage for a short time due to a drop of the network a.c. voltage, which is monitored by discriminators, not represented, the fuel cell 8 operates in the standby mode, in which it is supplied with gas, for example via bypasses of the valves 17, 18. After a voltage breakdown of the network voltage below a predeterminable threshold has been detected, by opening the valves 17, 18 the fuel cell 8 is rapidly brought to full output, which is sufficient for supplying the consumers 1, 2. The contactless switch 4 is opened, so that the inverted rectifier 4 does not feed energy into the network 6. The fuel cell 8 is a polymer electrolyte diaphragm fuel cell. It has been shown that such a fuel cell can be rapidly accelerated to rated output from standby operation by an rapid increase in the fed-in reactants. In this case a brief overload, for example until the opening of the switch 4, does not cause damage. A rapidly operating contactless switch, which in particular operates with IGBTs, is preferred, in order to rapidly supply the full a.c. voltage from the inverted rectifier 7 and the required currents to the consumers 1, 2. It is also possible to employ anti-parallel switched thyristors, which operate sufficiently fast for some uses. A capacitor 19 is connected in parallel with the output of the fuel cell 8. The capacitor 19 supplies the consumers with energy during the short period of time between the drop in voltage and the full operation of the fuel cell, or respectively the opening of the switch 4.

Since during standby operation of the fuel cell 8 the charging rectifier 11 covers the open-circuit losses of the inverted rectifier 7, which operates in parallel with the network, the requirements for reactants is only small during the standby operation of the fuel cell 8. Therefore the reserve of hydrogen and compressed air lasts a very long time with the network not interrupted.

The store of reactants can be determined by the respective gas pressure in the tanks 9, 10. It is also practical to monitor the gas pressures by means of appropriate measuring apparatus. For example, a measuring apparatus having two threshold values is preferably used. Reaching the first threshold triggers a report which indicates that replenishing the supply of hydrogen or air would be practical. But a perfect operation of the current supply device is still possible at this threshold value. The second threshold value triggers a report which indicates that the pressure is no longer sufficient for perfect operation. An appropriate report can also block the inverted rectifier.

A reformer 13 is furthermore connected to the inlet of the fuel cell, which can be supplied via metering pumps, not represented, from a methanol tank 14. The inlet of the fuel cell for oxygen is furthermore connected with a compressor 15, which is driven by a motor 16.

The supply of the fuel cell 8 from the hydrogen tank 8 and the compressed air tank 10 is sufficient for a defined tiding-over period of, for example, up to 15 or 30 minutes. If the network voltage is disrupted for a longer time, the methanol tank 14 and the compressor 15 take over the supply with reactants. Thus, tiding over for an extended time is possible with the aid of the additional supply means. Magnet valves, which are supplied as consumers, for example, by the inverted rectifier 7, are for example arranged in the appropriate lines for the switch from short term to long term tiding-over periods.

We claim:

1. An arrangement for an interruption-free energy supply to an electrical consumer, comprising:
   an a.c. voltage network,
   a protone exchange membrane fuel cell;
   a switch which connects the electrical consumer to said a.c. voltage network when the network voltage of said a.c. voltage network lies above a threshold value and disconnects the electrical consumer from said a.c. voltage network when the network voltage of said a.c. voltage network lies below said threshold value; and
   an inverted rectifier connected to said fuel cell and to said switch, wherein:
      said fuel cell is maintained in a standby mode when the network voltage of said a.c. voltage network lies above said threshold value, and
      said fuel cell takes over the energy supply to the electrical consumer within a few milliseconds when the network voltage of said a.c. voltage network drops below said threshold value.

2. The arrangement as defined in claim 1, further comprising:

a choke, connected in series with said switch and said a.c. voltage network. losses of said inverted rectifier and the reactive power during uninterrupted network operation.

3. The arrangement as defined in claim 1, further comprising:

a rectifier connected to said inverted rectifier and said a.c. voltage network, wherein said inverted rectifier has open-circuit losses, reactive power is associated with uninterrupted network operation and said rectifier compensates for the open-circuit losses of said inverted rectifier and the reactive power during uninterrupted network operation.

4. The arrangement as defined in claim 1, further comprising:

a container connected to said fuel cell for supplying hydrogen to said fuel cell; and a container connected to said fuel cell for supply oxygen to said fuel cell.

5. The arrangement as defined in claim 4, wherein the oxygen is supplied from compressed air.

6. The arrangement as defined in claim 1, wherein reactants are associated with said fuel cell, the arrangement further comprising:

pressure sensors which measure the pressures of the reactants to determine the operational readiness of said fuel cell by issuing an indication at at least one threshold which is assigned to a limit of the reactant supply.

7. The arrangement as defined in claim 1, further comprising:

a compressor connectable to said fuel cell; and a device connectable to said fuel cell, for reforming methane into hydrogen, wherein:

said compressor and said device serve to supply reactants during a long term tiding-over period.

8. The arrangement as defined in claim 1, further comprising:

a capacitor connected in parallel with the outlet of said fuel cell.

* * * * *